United States Patent
Karschnia et al.

(10) Patent No.: US 7,330,695 B2
(45) Date of Patent: Feb. 12, 2008

(54) BUS POWERED WIRELESS TRANSMITTER

(75) Inventors: Robert J. Karschnia, Chaska, MN (US); Marcos Peluso, Chanhassen, MN (US); Mark G. Romo, Eden Prairie, MN (US)

(73) Assignee: Rosemount, Inc., Eden Prairie, MN (US)

(*) Notice: Subject to any disclaimer, the term of this patent is extended or adjusted under 35 U.S.C. 154(b) by 656 days.

(21) Appl. No.: 10/734,889

(22) Filed: Dec. 12, 2003

(65) Prior Publication Data

US 2005/0130605 A1 Jun. 16, 2005

(51) Int. Cl.
*H04B 7/00* (2006.01)

(52) U.S. Cl. ............... 455/41.2; 455/134; 455/424; 455/572; 455/575.1; 455/90.3; 340/531; 396/58

(58) Field of Classification Search ............... 455/41.2, 455/420, 575.1, 575.2, 569.1, 557, 556.1, 455/426.1, 134, 90.3
See application file for complete search history.

(56) References Cited

U.S. PATENT DOCUMENTS

| | | | |
|---|---|---|---|
| 5,224,648 A | | 7/1993 | Simon et al. |
| 5,469,150 A | | 11/1995 | Sitte |
| 5,731,664 A | * | 3/1998 | Posa .................. 315/194 |
| 5,841,360 A | | 11/1998 | Binder |
| 5,890,074 A | * | 3/1999 | Rydbeck et al. ............ 455/558 |
| 5,970,418 A | * | 10/1999 | Budd et al. .................. 455/566 |
| 5,978,689 A | * | 11/1999 | Tuoriniemi et al. ...... 455/569.1 |
| 6,078,825 A | * | 6/2000 | Hahn et al. ............... 455/569.2 |
| 6,144,864 A | * | 11/2000 | Lands et al. ............. 455/569.1 |
| 6,151,298 A | | 11/2000 | Bernhardsson et al. |
| 6,236,334 B1 | * | 5/2001 | Tapperson et al. ..... 340/825.37 |
| 6,298,066 B1 | | 10/2001 | Wettroth et al. |
| 6,424,872 B1 | | 7/2002 | Glanzer et al. |
| 6,504,489 B1 | | 1/2003 | Westfield et al. |
| 6,567,006 B1 | | 5/2003 | Lander et al. |
| 6,604,033 B1 | | 8/2003 | Banet et al. |
| 6,686,831 B2 | * | 2/2004 | Cook et al. .................. 323/273 |
| 6,765,968 B1 | * | 7/2004 | Nelson et al. ............... 375/257 |
| 6,795,941 B2 | * | 9/2004 | Nickels ....................... 714/706 |
| 6,807,434 B1 | * | 10/2004 | Yang ........................ 455/569.1 |
| 6,868,284 B2 | * | 3/2005 | Bae ........................... 455/575.2 |
| 7,027,841 B2 | * | 4/2006 | Ishii ......................... 455/569.1 |
| 7,053,767 B2 | * | 5/2006 | Petite et al. ................. 340/531 |
| 7,093,050 B2 | * | 8/2006 | Niklasson .................... 710/305 |
| 7,110,798 B2 | * | 9/2006 | Nassimi ..................... 455/575.2 |
| 2003/0036819 A1 | | 2/2003 | Lehr et al. |
| 2003/0043052 A1 | | 3/2003 | Tapperson et al. |

OTHER PUBLICATIONS

G. Asada, et al., Wireless Integrated Network Sensors:Low Power Systems on a Chip, 1998.

* cited by examiner

*Primary Examiner*—Marceau Milord
(74) *Attorney, Agent, or Firm*—Kinney & Lange, P.A.

(57) ABSTRACT

A process control system utilizes wireless transceivers to divorce the field devices from traditional wired network topologies. By providing field devices with wireless transceivers and shared wireless transceivers for adapting wired field devices, the field device network may be adapted to any number of network topologies without concern for additional wiring costs. Specifically, a power supply can be provided for each field device or for groups of field devices, as needed. Thus, the entire network can receive power from a single power bus, without expensive power filtering. In addition, the network can be a hybrid in which part of the information is transmitted and received over wired lines and part is transmitted and received over wireless communications.

36 Claims, 6 Drawing Sheets

BUS POWERED WIRELESS TRANSMITTER

BACKGROUND OF THE INVENTION

The present invention relates to process control transmitters used to measure process variables in industrial processing plants. More particularly, the present invention relates to field devices with wireless transceivers powered by an external common DC bus for power supply or by an existing power circuit.

In industrial settings, control systems monitor and control inventories, industrial and chemical processes, and the like. Typically, the control system perform these functions using field devices distributed at key locations in the industrial process and coupled to the control circuitry in the control room by a process control loop. The term "field device" refers to any device that performs a function in a distributed control system, including all devices currently known in the measurement and control art.

Generally, each field device includes a transducer. A transducer is understood to mean either a device that generates an output signal based on a physical input or that generates a physical output based on an input signal. Typically, a transducer transforms an input into an output having a different form. For example, a loudspeaker is a transducer that transforms electrical signals into sound energy. Types of transducers include various analytical equipment, pressure sensors, thermistors, thermocouples, strain gauges, flow transmitters, positioners, actuators, solenoids, indicator lights, and the like.

Typically, each field device also includes a transmitter that boosts the transducer's signal in a standard format. Such transmitters generally communicate with the control room via the process control loop. Typically, the process control loop delivers a regulated current and/or voltage for powering the field devices. Additionally, the process control loop may carry encoded signals.

Traditionally, analog field devices have been connected to the control room by two-wire twisted-pair current loops, with each device connected to the control room by a single two-wire twisted pair loop. Typically, a voltage differential is maintained between the two wires within a range of voltages from 12-45 volts for analog mode and 9-50 volts for digital mode. An analog field device transmits a signal to the control room by modulating the current running through the current loop to a current proportional to the sensed process variable. An analog field device that performs an action under the control of the control room is controlled by the magnitude of the current through the loop, which is modulated by the ports of the process subsystem under the control of the control room.

Discrete or digital field devices respond to a binary signals and transmit binary information. Typically, discrete devices operate with a 5-30 volt signal (AC or DC), a 120 or 240 volt AC signal, delivered by the same or similar two-wire twisted pair loops. Of course, a discrete device may be designed to operate according to any electrical specification required by the control environment.

Generally, in industrial plants, the individual field devices are wired to a junction box, and from there to the control room or to marshaling racks through home run cables. Since cabling distances from the field device to the junction box are relatively short, the bulk of the cabling cost is in the home run cable. HART® is a well established standard but control systems in general do not support HART® multidrop configurations; therefore, there is little savings from wiring using the HART® protocol. The few control systems supporting HART® generally have limited access to device diagnostics and do not use the digital information for control due to speed limitations.

Since communications and power typically are delivered over the same wires, various properties must be taken into account in order to have a successful installation, such as proper shielding against noise, low ripple power supplies, appropriate line and power impedances, wire length and properties, impedance, terminations, and the like. Using the same pair of wires for communication and power also makes power regulation of the device more complicated. Simple low pass filters cannot be used to remove noise from the power signal because a "notch" at the communications frequency must be allowed to pass. Specifically, the low pass filter has a tendency to "refine" the load current, thereby reducing ripples or notches in the AC communication signal. It is important to note that the transmitters are basically shunt regulators that shunt between 4 and 20 mA in analog transmitters. In order to shunt on the low end (i.e. at 4 mA), the transmitter must operate at a power of less then 4 mA.

With the advent of low power wireless communications, many new network topologies can be imagined. However, power constraints of wireless transmitters typically limit process control networks to the traditional wired topology. A truly wireless field device is one that contains its own source of power, such as a battery, solar power, fuel cell, an energy scavenging power source, and the like, and is not constrained by traditional wired configurations.

However, such wireless transmitters suffer from the basic problem of low available power, which tends to limit the utility of such field devices. Specifically, the low available power forces the use of low data rates to help conserve energy, and/or requires frequent, periodic replacement of the power source. Transmission power also restrains the transmitting distance.

BRIEF SUMMARY OF THE INVENTION

A system for supplying power to a plurality of field devices has a plant-wide or field-based power bus for delivering power to each field device. Some field devices are adapted to regulate their own power and to communicate wirelessly with a control center. Other field devices are connected to the network via a junction box, and the junction box is adapted to regulate power to a cluster of field devices. The junction box may also be adapted for shared wireless communication with the control center. Existing process control networks may be adapted for wireless communication by integrating a wireless transceiver with the control center. The process control network may be entirely wireless or may be a hybrid wired/wireless network. Each field device has a housing, a transducer within the housing, and an electrical terminal for delivering power to the circuit from an existing power circuit. In some embodiments, each field device contains a wireless communications board for communicating wirelessly with the control center. In an alternative embodiment, clusters of field devices share a wireless communication board disposed within a junction box for communicating wirelessly with the control center. The wireless communications boards utilize standard communications protocols to facilitate communications between the field devices and the control center and between various field devices. In this manner, the system may be organized as a traditional process control network or may be organized dynamically as a self-organizing network.

DETAILED DESCRIPTION

The present invention takes advantage of available wireless technologies to free the process control network from its traditional wired topologies. Wireless transceivers can be used both to adapt existing process control networks to provide wireless communications capabilities and to construct process control networks without costly homerun cabling and without expensive power filters.

In general, the wireless transceivers send and receive data wirelessly, thereby divorcing the signaling or communications path from the physical wiring. While conventional process control networks provided power and signaling over the same set of wires, by handling the power supply to the field devices separately from the signaling or communications path in the present invention, the field devices are no longer bound to the physical wiring of a control network. Instead, data is transmitted wirelessly, and power is supplied to the field devices from a variety of different means, allowing the field devices to be deployed dynamically and to be arranged in a variety of ways.

While conventional process control networks utilized costly power filters to maintain a tightly controlled power distribution, the separation of the power supply from the communications path allows field devices to be provided with their own power supply circuitry, which can be much cheaper and less tightly controlled than conventional systems. Thus, an entire process control network can be constructed without expensive power filtering and with distributed field devices drawing power from many different sources. Such sources may include batteries, existing homerun cabling, standard plant-wide power (e.g. a wall outlet providing conventional 120 AC power, and the like), a single charged wire, solar power circuitry, and various other power sources. In general, since the power supply does not need to be tightly regulated and since communications is handled wirelessly between the field devices and control systems within the control room, any type of power supply can be utilized to power the field devices. By powering the field devices from power supplies that are separate from the communications path, the process control network architecture becomes more versatile and with lower cost, allowing for network topologies that were not previously possible without significant investment in cabling and allowing for inexpensive hardware components.

With the present invention, it is possible to integrate wireless technologies with existing process control networks. Specifically, wireless devices may be added to existing networks and existing field devices may be adapted to transmit wireless information. Additionally, existing cabling may be utilized differently to deliver power to field devices (individually and in clusters), and to allow flexibility in extending or shrinking the size of the network.

Figure 1:
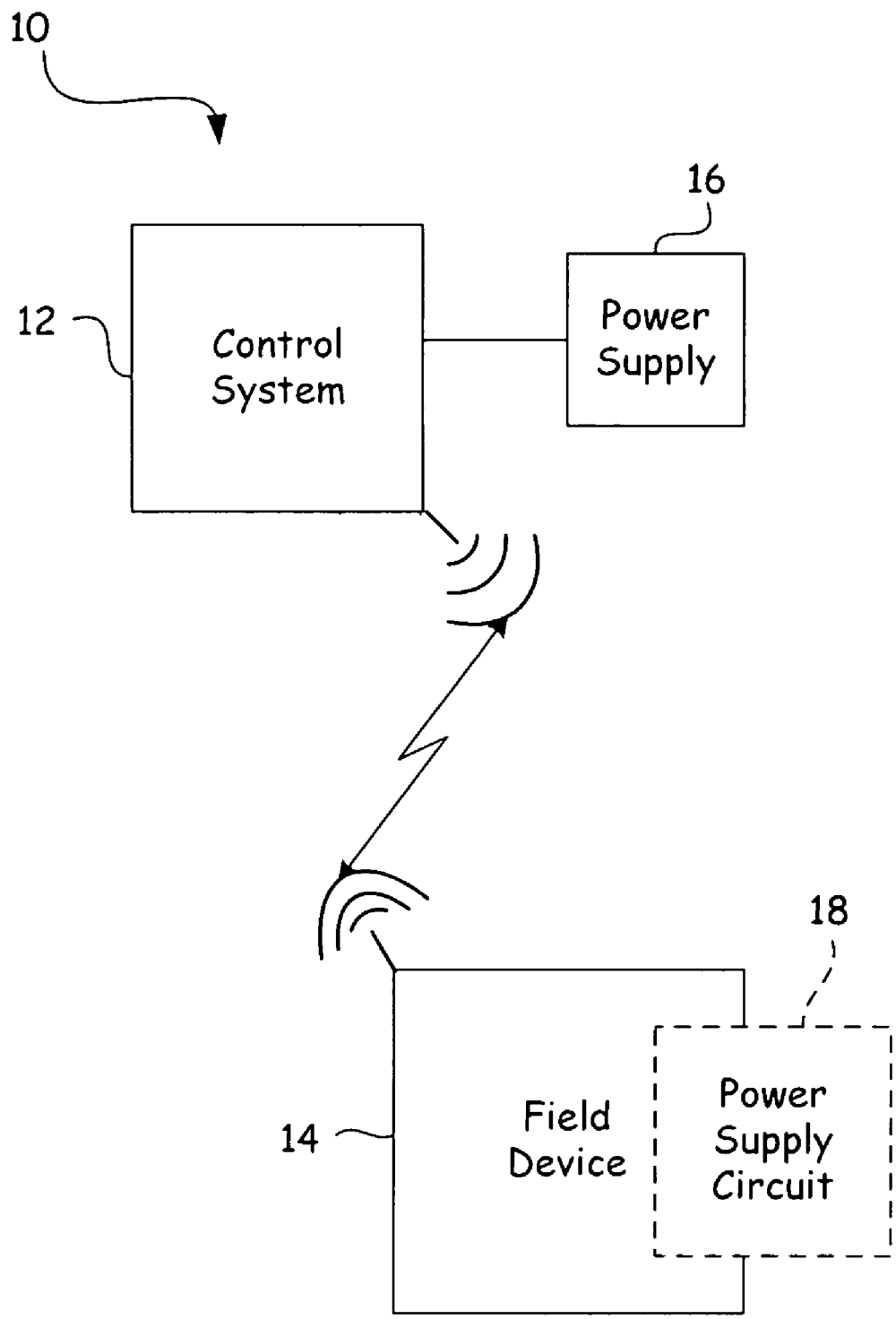
FIG. 1 is a block diagram of a wireless field device process control system of the present invention.

As shown in FIG. 1, a process control network 10 has a control system 12 and a field device 14, having a power supply 16 and a power supply circuit 18 (shown in phantom), respectively. The power supply circuit 18 is shown in phantom to indicate that the power supply circuit 18 may be internal or external to the field device 14. As shown, the field device 14 communicates with the control system 12, wirelessly, to transmit and to receive data and various signals.

Generally, the control system 12 refers to one or more computer systems for exercising control and/or monitoring of an industrial process. The control system 12 may be confined within a control room, may span more than one office, or may be geographically separated and connected via a network (such as telephone networks, the Internet, or any other type of network). Additionally, the control system 12 includes both automated and user initiated control systems.

In this embodiment, the control system 12 and the field device 14 may be powered by the same circuit or by independent power supplies. However, by providing the field devices 14 with their own power supply circuit 18, expensive and tightly controlled filtering is no longer required. Nor are long wires required to power the device. Relatively unregulated power supplies can be used to deliver power to the field devices 14, allowing field devices 14 to be powered with simple, inexpensive power supplies 16,18. With the present invention, since filtering of transmitted information not a concern with respect to the wiring, the power supplies 16,18 can use simple filtering techniques.

It is important to note that FIG. 1 assumes that the control system 12 is equipped or configured to transmit and receive data and signals, wirelessly. Additionally, the embodiment of FIG. 1 illustrates a field device 14 with wireless transmission and reception capabilities.

Figure 2:
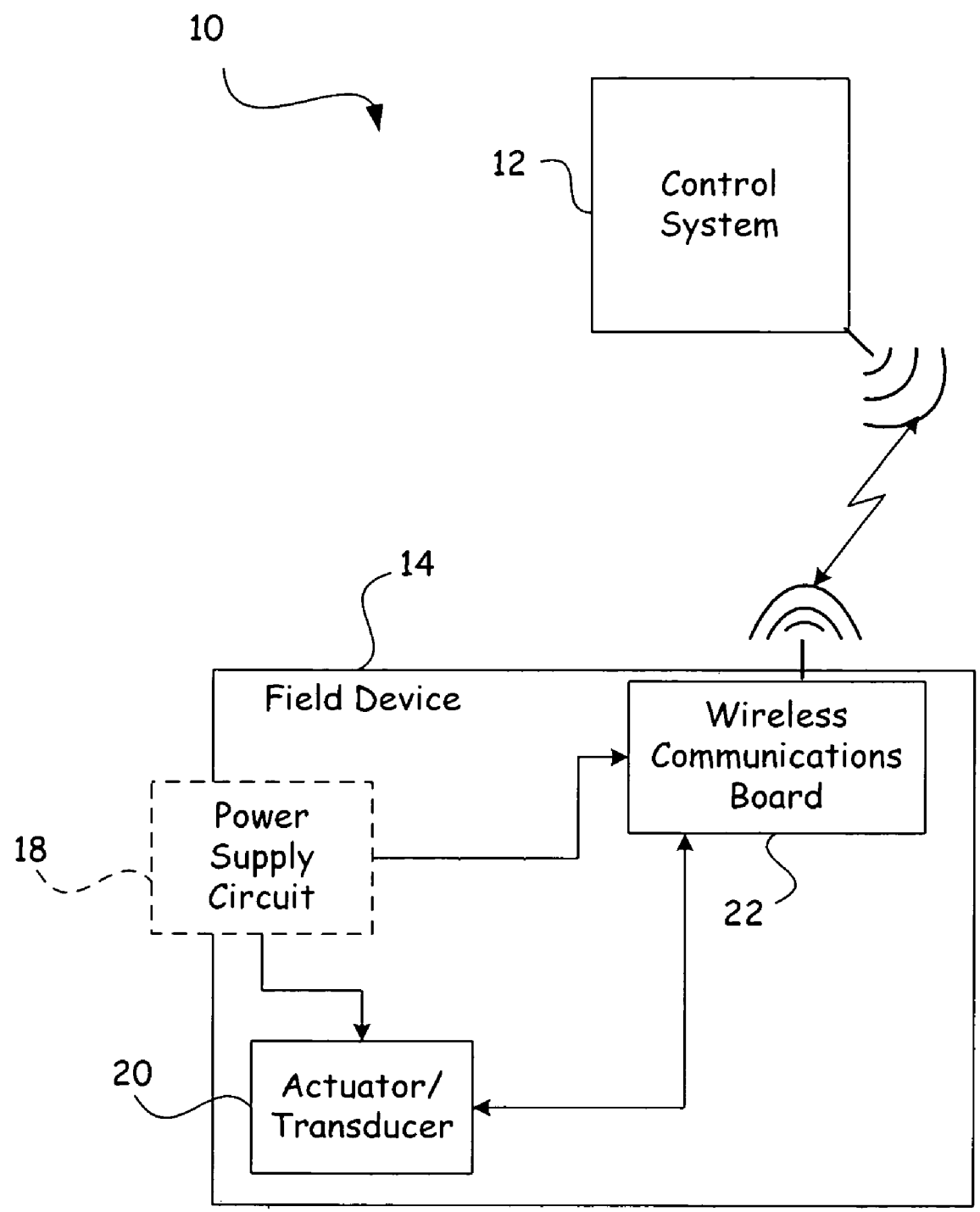
FIG. 2 is a block diagram of a wireless field device of FIG. 1.

FIG. 2 shows a process control system 10 having a control system 12 and a field device 14, both capable of wireless communications. As shown, the field device 14 has a power supply circuit 18, which delivers power to an actuator/transducer 20 (hereinafter referred to as "transducer 20") and to a wireless communications board 22. The wireless communications board 22 refers to circuitry for transmitting and receiving information wirelessly between the control system 12 and the field device 14. In some instances, the wireless communications board 22 may perform other functions, such as digitizing analog information received from the transducer 20, prior to transmission of the information.

The transducer 20 is understood to refer to any device that translates an input into an output having a different form from the input (e.g. a device that generates a physical output based on an electrical input signal or an electrical output based on a physical input signal). Thus, the field device 14 containing a transducer 20 can be either an input device or an output device or both. The field device 14 can contain both input and output components in communication with the communications board 22. For example, the field device 14 may contain both a sensor and indicator lights or an LCD display, for sensing information and transmitting the raw data or raw A/D count to the wireless communications board 22, and for receiving a display signal or display code from transceiver 24 of the control system 12 and displaying a value on the display.

Generally, the wireless communications board 22 and the wireless transceiver 24 are each capable of two-way, wireless communications, allowing for two-way wireless communications between the control system 12 and the field devices 14. The two-way wireless communication may be completed using wireless networking technologies (such as IEEE 802.11b wireless access points and wireless networking devices built by Linksys of Irvine, Calif.), cellular or digital networking technologies (such as Microburst® by Aeris Communications, Inc. of San Jose, Calif.), ultra wide band, free space optics, Global System for Mobile Communications (GSM), General Packet Radio Service (GPRS), Code Division Multiple Access (CDMA), spread spectrum technology, infrared communication techniques, SMS (short messaging service/text messaging), or any other wireless technology. More generally, the present invention can make use of any wireless protocol capable of supporting data transmissions, including transmissions over any circuit switched network or any packetized routing network.

Again, the power supply circuit 18 is shown in phantom to illustrate that the power supply circuit 18 maybe contained within the field device 14 or may be separate from the field device 14. The power supply 16 (shown in FIG. 1) for the control system 12 may be a plant-wide power bus, a standard power circuit, or any other type of power supply. As shown, the field device 14 is powered independently from the control system 12, and wireless data transmissions between the field device 14 and the control system 12 do not impact the power supply scheme.

The power supply circuit 18 of the field device 14 may be a wall-plug with a transformer for stepping down and filtering power from a standard electrical socket. Alternatively, the power supply circuit 18 of the field device 14 may be a filtering circuit connected to a plant-wide power bus, or a rechargeable battery connected with a solar device, or any other power supply. In general, the power supply circuit 18 refers to any circuitry required to deliver an appropriate voltage and/or current level to a field device 14 for operation.

It is important to understand that traditional process control networks employ homerun cabling to connect a control center with distributed field devices. Typically, the homerun cabling extends from the control center to a junction box, which in turn connects directly to the field devices. Communications between the field devices and the control center traverse a path from the control center, through the junction box and on to the field device, and information from the field device is transmitted over the same path in reverse.

Figure 3:
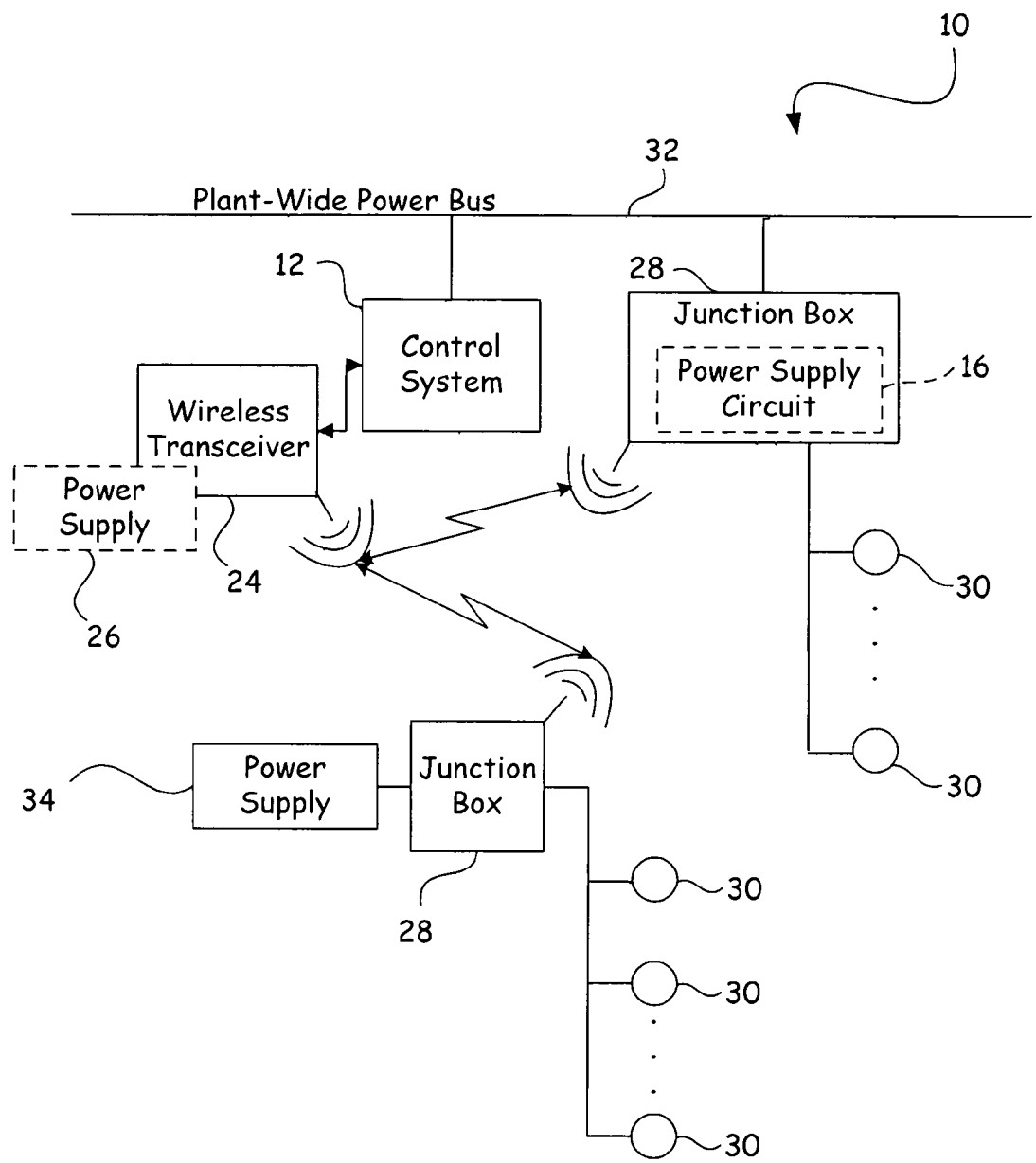
FIG. 3 is a block diagram of distributed wireless process control network having junction boxes adapted to deliver power to field devices and to transmit field device data wirelessly via a shared wireless transceiver.

FIG. 3 illustrates an embodiment of the process control system 10 according to the present invention, which is made possible by the wireless transmission capabilities. In particular, the process control system 10 has a control system 12, which does not by itself have wireless capability. However, the control system 12 is coupled with a wireless transceiver 24, which may have its own power supply 26 (internal or external to the wireless transceiver 24). The wireless transceiver 24 adapts the control system 12 to send and receive information wirelessly. Thus, with minimal additional equipment, the control system 12 is capable of issuing and receiving signals wirelessly.

The process control system 10 also has one or more junction boxes 28 connected with several field devices 30 and with a power supply 34 and/or a power supply circuit 16. In this instance, unlike field devices 14 (in FIGS. 1 and 2) which are provided with their own wireless capabilities, the field devices 30 cannot directly transmit and receive information wirelessly. However, the junction boxes 28 can be adapted to provide shared wireless transceivers, such that data can be transmitted over wires from the field device 30 to the junction box 28 and then wirelessly from the junction box 28 to the wireless transceiver 24 and then to the control system 12.

With respect to power delivery, in this embodiment, the junction boxes 28 deliver power to each field device 30. The junction box 28 can be provided with an external power supply 34 and/or with a power supply circuit 16 for regulating power to the field devices 30. Additionally, the junction box 28 may draw power from a plant-wide power bus 32, or from any other power source, including an electrical outlet.

By adapting existing networks to send and receive information wirelessly, a number of advantages are obtained over traditional wired network topologies. First, additional wired field devices 30 and wireless field devices 14 (FIG. 2) can be added without the cost of additional homerun cabling.

Additionally, "smart devices" (for example, field devices 14 or 30 capable of transmitting diagnostic information, device failure information, and the like, to the control system 12) can be added to the process control network 10, without requiring changes to the control system 12. In particular, while it is possible to add smart devices to a traditional process control network, a traditional control system may not pay attention or be capable of making use of the transmitted diagnostic information. The adaptation of the control system 12 to send and receive wireless information via the wireless transceiver 24 ensures that the diagnostic information reaches the control system 12 without being filtered out. Additionally, if the control system 12 cannot make use of the information transmitted by the smart device, the data need not be lost as it can be received at the wireless transceiver 24 and then programmatically diverted to a computer within the control room that can make use of the diagnostic information. In this way, a control system can be adapted to become a control and monitoring system, with minimal investment in equipment and software.

Finally, since information is transmitted wirelessly between the field devices 30 and the control system 12 via the wireless transceiver 24, the requirements for power regulation are minimized, allowing for cheaper power supplies. As previously discussed, conventional process control networks required tight control over the power supply because the same cable often carried both the power and the signals. Since communications and power are run across the same wire, the power regulation at the device is complicated, and therefore expensive. Typically, special power conditioners and/or terminators had to be installed to allow such signaling. Moreover, the cabling was expensive because it had to be shielded cabling, because it had to be balanced with a selected impedance, and so on. Simple low-pass filters cannot be used because a "notch" at the communications frequency must be allowed to pass. Additionally, conventional field devices do not include power regulation circuitry or signal filtering circuitry that is sophisticated enough to handle signal transmissions over a wire carrying an unregulated voltage.

With the present invention, the plant-wide power bus 32 can be a loosely regulated power line, without concern for the field devices 30, because the localized power supplies 34 or power circuits 16 can perform the necessary filtering. Thus, the plant-wide power bus 32 can be a single wire bearing a voltage potential. For example, the plant-wide power bus 32 can deliver a twenty-four or forty-eight volt alternating current (AC) or direct current (DC).

Alternatively, the various devices can be powered from existing power circuitry in the walls through standard electrical outlets, which may be a 120 or 240 V AC circuit, such as the circuits that provide power to plugs and switches within offices. In industrial settings, such power circuits may be 480 V, and in countries outside of America, other voltage amplitudes may be employed.

As previously discussed, it is also possible to power field devices 30, 14 from batteries or solar power, depending on the specific signaling requirements. For example, it may be inefficient to use batteries in an environment where the device 30,14 must signal frequently, because the batteries would wear out quickly, requiring frequent replacement. However, if the batteries are rechargeable and are used in an environment where they can recharge themselves (via solar panels) or where they are infrequently used, then such power sources can also be utilized.

In essence, the junction box 28 allows for clusters of wireless field devices 14 or wired field device 30 to be added to a process control network 10 without the need for additional homerun cabling. Such clusters of field devices can be powered by a simple local power grid or via individual power sources. Since plants typically have AC power run throughout the facilities, similar to a house, a cheap power supply could be used to provide the DC power to a cluster of transmitters simply by tapping into the existing AC power and stepping down the voltage.

Figure 4:
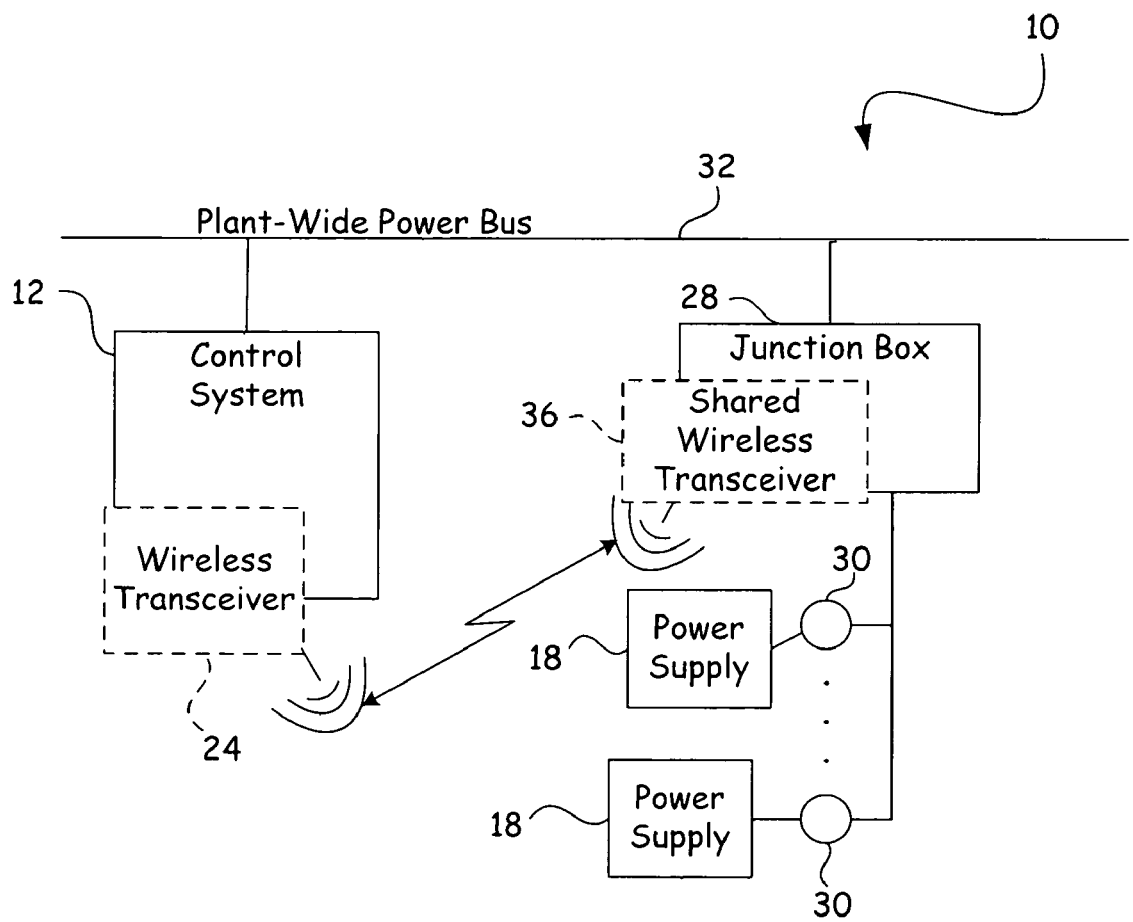
FIG. 4 is a block diagram of a distributed wireless process control network having junction boxes adapted to provide a shared wireless transceiver to a group of field devices, each having its own power supply.

FIG. 4 illustrates an alternative embodiment of the present invention wherein the field device 30 is provided with its own power supply 18. In this embodiment, the junction box 28 and the control system 12 are both powered from the plant-wide power bus 32. The control system 12 is adapted for wireless transmissions via a wireless transceiver 24. Additionally, the junction box 28 is provided with a shared wireless transceiver 36 (shown in phantom) to adapt the cluster of wired field devices 30 for wireless transmissions.

In this way, the individual power supplies and wiring for the junction box 28 (not shown) and the power supplies 18 for the field devices 30 can be made very cheaply, to provide the appropriate level of power to each of the various components without concern for signal filtering. Once again, since wireless transmissions are used to communicate between the field devices 30 and the control system 12, the power supply means can be essentially "ad hoc", meaning as needed to fit the particular circumstance and without consideration of wider application.

Thus, by divorcing power delivery from signaling, field devices 30,14 can be inserted into an existing network by tapping into an existing power circuit, such as a standard AC power circuit (e.g. via a wall outlet). The power supply 18 may be simply a standard plug with a transformer. Alternatively, the power supply 18 may be a rechargeable battery connected with a solar panel or other environmentally sustainable power source. In another embodiment, the power supply 18 may be a rechargeable battery connected to a standard wall socket or an uninterruptable power supply (UPS), similar to (but smaller than) such devices designed for power failover in networks and the like.

More importantly, since the voltage supply does not need to be as tightly regulated, simple low-pass or other types of filters can be used to provide power regulation at the field devices 18 or in the junction box 28. In this way, the overall cost of installation and expansion of a process control network 10 is reduced, in part, because additional field devices 14, 30 and junction boxes 28 can be added to the network 10 without expensive homerun cabling 14.

In general, by divorcing the signaling path from the power supply and by providing a variety of means for delivering power to the field devices 14 and 30, the process control network 10 can be configured in multiple ways, using network topologies and configurations that might not otherwise be feasible. Specifically, additional field devices 14 and 30 (together with shared wireless transceivers 36 as needed) can be added to the process control network 10 as needed, and without concern for the geographic proximity of the individual wireless field devices 14 or of the adapted field devices 30 to the existing network wiring. Using standard and inexpensive power supplies coupled with existing power circuitry, field devices 30 (with a shared wireless transceiver 36) and field devices 14 (with built-in wireless communications boards 22) can communicate wirelessly with the control system 12, regardless of their physical location relative to the control system 12.

The present invention introduces several advantages over traditional control networks. First, by divorcing the power supply and the signaling path, the present invention allows for inexpensive expansion of existing networks because once the control system 12 is adapted for wireless transmissions, new field devices 14 can be added as needed without requiring additional wiring. Additionally, by relying on existing power networks to power individual field devices 14 or groups of field devices 14 or 30, the number of field devices 14,30 in the network is not limited by cabling, allowing for easy expansion of existing networks 10. Furthermore, since the field devices 14,30 no longer derive their power and signals from the same path, communication may be dramatically and/or dynamically altered. Specifically, in certain circumstances, it may be desirable for the field devices 14,30 or rather their communications with the control system 12 to be self-organizing.

Figure 5:
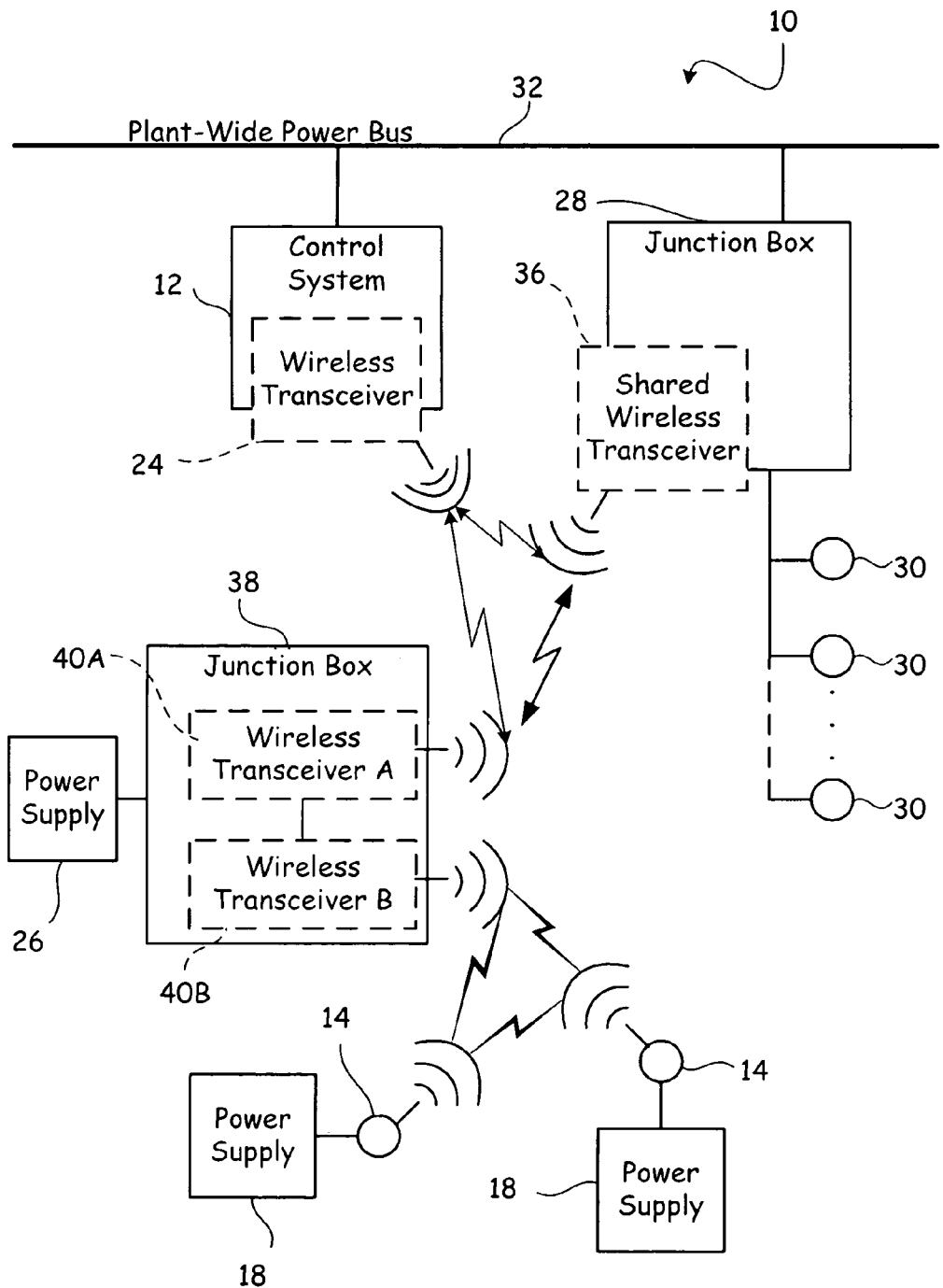
FIG. 5 is a block diagram of a self-organizing wireless process control network according to the present invention.

FIG. 5 illustrates a hybrid network containing a self-organizing wireless communication component and the wireless communication discussed with respect to FIGS. 1-4. As shown, the control system 12 is adapted to transmit and receive information wirelessly via a wireless transceiver 24. The control system 12 is powered by a plant-wide power bus 32, which may be a single voltage carrying wire, an existing power circuit, or any other power delivery mechanism. Depending on what type of power delivery mechanism the plant-wide power bus 32 is, the control system 12 and the junction box 28 may be provided as required with power filtering circuitry (not shown).

As shown, a junction box 28 is adapted to provide wireless communications between wired field devices 30 and the control system 12 via a shared wireless transceiver 36. The junction box 28 draws power from the same plant-wide power bus 32 as the control system 12.

Finally, in this embodiment, a self-organizing portion of the control network 10 includes a junction box 38 provided with a wireless transceiver 40A and a wireless transceiver 40B. The junction box 38 is powered with its own power supply 26. Two field devices 14 in communication with each other and with the wireless transceiver 40B of the junction box 38 are shown. Each field device 14 is provided with its own power supply 18.

In this embodiment, the field devices 14 include a wireless transceiver and a transducer/actuator (not shown). The wireless transceiver of the field devices 14 (in this instance) may be short range or 802.11(b) type communications (or any other type of wireless communications). The field devices 14 can relay messages from another field device 14 or communicate directly with the junction box 38 and its wireless transceiver 40B. The junction box 38 relays information between the control center 12 and the field devices 14. Specifically, information sent by the field devices 14 is received by the wireless transceiver 40B, which passes the information to wireless transceiver 40A for transmission to the control center 12 via wireless transceiver 24. Signals sent from the control center 12 follow the same path in reverse. If, for some reason, a field device 14 is unable to transmit directly to the junction box 38, the field device 14 can simply find a different path, by transmitting the data to the junction box 38 via another field device 14.

As shown, the type of signal between the field devices 14 and the junction box 38 are different than those between the junction box 38 and the control system 12, indicating a different type of transceiver card. However, the entire control network 10 can be implemented as a self organizing network, such that data could travel back and forth across the network by wirelessly relaying the information. Essentially, the field devices 14 can be implemented to form a loose-knit, variable, process control network 10, which can adapt to transmit and receive information between field devices 14 and the control system 12 via any available data path. This type of network may utilize 802.11 (b)-type, short-range wireless communications, infrared, or any type of wireless communications.

With a self-organizing process control network 10, newly added field devices 14 simply see the wireless signal and begin communicating. If, for some reason, a field device 26 goes off-line, transmissions can be instantly adapted over a different signal path via the self-organizing network. As shown, the signals may take different paths as needed. Moreover, new communication paths may be made or broken as needed to facilitate communications between the control system 12 and the individual field devices 14.

The advantages of the self-organizing network architecture are numerous, though one foreseeable downside is the fact that a significant portion of a plant may need to be "set up" for this architecture to work. As wireless connectivity becomes cheaper and easier to use, existing systems can be adapted easily and cost effectively. Also, if the communication protocol that is selected is a standard communications protocol (such as IEEE 802.15.4 and the like), connection to the host is made very simple. The cost advantages of this architecture are so large and the prices of wireless components are so cheap that the adaptation of a traditional host system can be very low cost.

An additional advantage of this system 10 is that current power supplies used to power wireless sensors or field devices 14 would be eliminated, thereby reducing environmental implications of spent power sources such as batteries. By powering the field devices 14 from an existing power circuit, no new infrastructure wiring is required and no new power source waste is generated. Moreover, cost savings in wiring alone can be significant, particularly in large plants or in control processes where the process changes dramatically.

Figure 6:
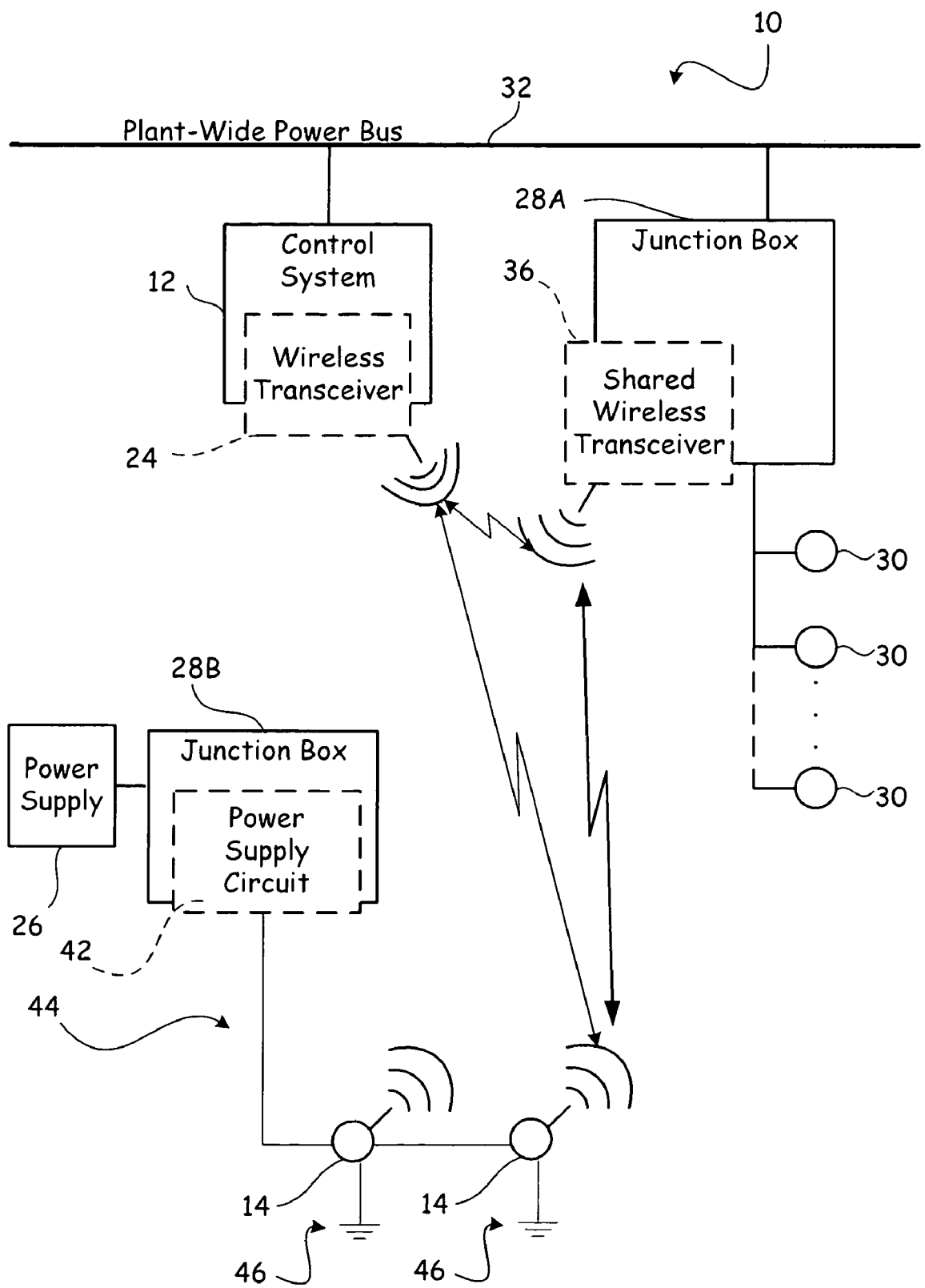
FIG. 6 is a block diagram of another embodiment of a wireless process control network according to the present invention.

FIG. 6 shows a process control network 10 with a control system 12 adapted for wireless communications via a wireless transceiver 24. A junction box 28 is provided with a shared wireless transceiver 36 for field devices 30. Both the control system 12 and the junction box 28A are powered from the same plant-wide power bus 32. A second junction box 28B is provided with a separate power supply 26 and a power supply circuit 42, for delivering power from the power supply 26 to the wireless field devices 14. As shown, the field devices 14 are individually grounded (ground 46), allowing the power to be delivered via a single wire 44 to one or more field devices 14.

As previously discussed, by divorcing the communication path from the power supply, the process control network 10 need no longer be defined by the wiring (or by the homerun cabling). By utilizing wireless communications, existing process control networks can be adapted and new process control and monitoring networks can be constructed, changed, and extended as needed and without expensive rewiring. In particular, wireless field devices 14 can be plugged in and added to an existing network on the fly, wired devices 30 can be adapted to provide wireless communications via a shared wireless transceiver 36, smart devices can be inserted, and each can be powered according to available power circuits. If a wall socket is nearby, the device can be plugged into the wall socket. Alternatively, a single voltage carrying wire (as opposed to more expensive homerun cabling) can be run throughout the facility, and power filtering can then be performed at the individual field devices 14, 30 or at the junction box in order to deliver the necessary power.

Although the present invention has been described with reference to preferred embodiments, workers skilled in the art will recognize that changes may be made in form and detail without departing from the spirit and scope of the invention.

The invention claimed is:

1. A distributed control and/or monitoring system within an industrial plant, the system comprising:
  a control/monitoring center;
  a plurality of field devices within the industrial plant having no hardwired communication link to the control/monitoring center and each other, each field device comprising:
    a transducer;
    a wireless transceiver for communicating wirelessly; and
  a plant-wide power bus for delivering power to each field device, wherein the power bus does not include and is separate from any communication signal path between the control/monitoring center and the field devices.

2. The distributed system of claim 1 wherein each field device further comprises:
  a power circuit for controlling power delivery from the power bus to the transducer and to the wireless transceiver within the field device.

3. The distributed system of claim 1 wherein the plant-wide power bus is a single wire bearing a voltage.

4. The distributed system of claim 1 wherein each of the plurality of field devices communicates wirelessly with the control/monitoring center.

5. The distributed system of claim 1 wherein some of the plurality of field devices are positioned within close proximity to one another in a cluster, the system further comprising:
  a power circuit connected to the plant-wide power bus for controlling power supplied to the cluster of field devices.

6. The distributed system of claim 5 wherein the power circuit further comprises:
  a ground loop connected to earth ground for electrically grounding each of the field devices in the cluster of field devices.

7. The distributed system of claim 5 wherein each field device is individually grounded to earth.

8. A distributed system for monitoring an industrial process within an industrial plant, the system comprising:

a control/monitoring center;

a plurality of field devices for sensing or altering the industrial process, each field device having a transducer and a wireless transceiver for communicating signals between the field device and the control/monitoring center; and a plant-wide power bus comprising a wire carrying an unfiltered voltage potential for delivering a voltage potential to each of the plurality of field devices, wherein the power bus does not include and is separate from any communication signal path between the control/monitoring center and the field devices.

9. The distributed system of claim 8 wherein each of the plurality of field devices further comprises:

a voltage regulator for controlling power delivered from the plant-wide power bus to the wireless transceiver.

10. The distributed system of claim 9 wherein each of the plurality of field devices further comprises:

a direct connection to a ground.

11. The distributed system of claim 8 wherein two or more of the plurality of field devices, which are in close proximity to one another, constitute a group, and further comprising:

a power supply for stepping down an existing alternating or direct current voltage from the plant-wide power bus to a lower voltage, wherein a single wire is connected from each field device to the power supply.

12. The distributed system of claim 8 wherein at least one field device further comprises:

a power regulation circuit for stepping down an existing alternating or direct current voltage from the plant-wide power bus to the voltage potential for delivery to the field device.

13. The distributed system of claim 8 wherein the voltage potential is less than five volts.

14. A distributed control and/or monitoring system in an industrial plant, the system comprising:

a control/monitoring center;

a plurality of field devices, each field device having a transducer;

a plurality of wireless transceivers, each wireless transceiver for sending and receiving wireless signals between the control/monitoring center and one or more of the plurality of field devices, each wireless transceiver being in electrical communication with at least one of the plurality of field devices; and power supplies for supplying power from a plant-wide power bus to the wireless transceivers and to the plurality of field devices, wherein the power bus does not include and is separate from any communication signal path between the control/monitoring center and the field devices.

15. The distributed system of claim 14 wherein the plant-wide power bus is a standard AC or DC circuit.

16. A method for retrofitting an existing field device network in an industrial plant for wireless communications, the method comprising:

installing a first wireless transceiver in communication with a control/monitoring center;

installing a second wireless transceiver on an existing plant-wide power bus and in communication with one or more field devices; and configuring the second wireless transmitter to communicate with the one or more field devices and to transmit data wirelessly from the one or more field devices to the control/monitoring center in addition to data transmitted over an existing communication link;

wherein the power bus does not include and is separate from any communication signal path between the control/monitoring center and the field devices.

17. The method of claim 16 further comprising:

installing a "smart" field device on the fieldbus network, the "smart" field device having a wireless transceiver, the "smart" field device for providing diagnostic information to the control center.

18. A distributed field device system comprising:

a single-wire plant-wide power bus; and a plurality of wireless field devices, each wireless field device comprising:

a transducer;

a wireless transceiver for sending information from the transducer to a control center; and power circuitry for drawing adequate power from the single-wire plant-wide power bus to power the transducer and the wireless transceiver;

wherein the power bus does not include and is separate from any communication signal path to or from the field devices.

19. The distributed field device system of claim 18 wherein each of the plurality of wireless field devices is electrically grounded.

20. A field device for use in an industrial plant having a plant-wide power bus, the field device comprising:

a transducer;

a wireless transceiver;

a power terminal for connecting the field device to the plant-wide power bus;

a ground connection for electrically grounding the field device; and an internal power supply circuit connected to the power terminal and the ground connection for supplying power to the transducer and the wireless transceiver;

wherein the power bus does not include and is separate from any communication signal path to or from the field devices.

21. The field device of claim 20 wherein the plant-wide power bus is a single wire carrying a voltage potential other than zero, and the power terminal is connectable to the single wire.

22. The field device of claim 20 wherein the field device is connectable directly to ground via the ground connection.

23. A field device for use in an industrial plant having a plant-wide power bus, the field device comprising:

a housing;

a circuit disposed within the housing, the circuit comprising:

a wireless transceiver for wireless communication with a control/monitoring center;

a transducer; and an electrical terminal connectable to the plant-wide power bus for delivering power to the wireless transceiver and the transducer from the plant-wide power bus;

wherein the power bus does not include and is separate from any communication signal path between the control/monitoring center and the field devices.

24. The field device of claim 23 wherein the plant-wide power bus is an AC or DC circuit.

25. The field device of claim 23, further comprising:

a ground connection for grounding the circuit.

26. A field device for use in an industrial plant having a plant-wide power bus, the field device comprising:

a transducer and/or an actuator;
a wireless transceiver; and
a power supply circuit connectable to the plant-wide power bus for delivering power to the transducer and/or the actuator and to the wireless transceiver;
wherein the power bus does not include and is separate from any communication signal path to or from the field devices.

27. The field device of claim 26 wherein the power supply circuit is connectable to a standard electrical outlet of the plant-wide power bus.

28. The field device of claim 26 wherein the field device is connected wirelessly with a network.

29. A distributed control and/or monitoring system comprising:
a control/monitoring center;
a plurality of field devices, each field device having a transducer;
a plurality of wireless transceivers, each wireless transceiver for sending and receiving wireless signals between the control/monitoring center and one or more of the plurality of field devices, each wireless transceiver being in electrical communication with at least one of the plurality of field devices;
power supplies for supplying power from an existing power circuit to the wireless transceivers and to the plurality of field devices;
a four-wire bus comprising:
a two-wire power bus in electrical communication with each of the power supplies; and
a two-wire communication bus connecting the control center with each field device;
wherein the wireless transducer wirelessly transmits data from each sensor to the control center that is not otherwise transmitted over the two-wire communication bus.

30. A distributed control and/or monitoring system comprising:
a control/monitoring center;
a plurality of field devices, each field device having a transducer;
a plurality of wireless transceivers, each wireless transceiver for sending and receiving wireless signals between the control/monitoring center and one or more of the plurality of field devices, each wireless transceiver being in electrical communication with at least one of the plurality of field devices;
power supplies for supplying power from an existing power circuit to the wireless transceivers and to the plurality of field devices;
a two-wire bus connecting the field devices and the control/monitoring center; and
wherein the wireless transceivers transmit data wirelessly from the field devices that is not otherwise transmitted over the two-wire bus.

31. A distributed control and/or monitoring system comprising:
a control/monitoring center;
a plurality of field devices having no hardwired communication link to the control/monitoring center and each other wherein each of the plurality of field devices communicate wirelessly with the control/monitoring center through a self-organizing wireless network, each field device comprising:
a transducer;
a wireless transceiver for communicating wirelessly; and
a common power bus for delivering power to each field device, wherein the power bus does not include and is separate from any communication signal path between the control/monitoring center and the field devices.

32. The distributed system of claim 31 wherein each field device further comprises:
a power circuit for controlling power delivery from the power bus to the transducer and to the wireless transceiver within the field device.

33. The distributed system of claim 31 wherein each the power bus is a single wire bearing a voltage.

34. The distributed system of claim 31 wherein some of the plurality of field devices are positioned within close proximity to one another in a cluster, the system further comprising:
a power circuit for controlling power supplied to the cluster of field devices.

35. The distributed system of claim 34 wherein the power circuit further comprises:
a ground loop connected to earth ground for electrically grounding each of the field devices in the cluster of field devices.

36. The distributed system of claim 34 wherein each field device is individually grounded to earth.

* * * * *

(12) EX PARTE REEXAMINATION CERTIFICATE (10503rd)
United States Patent
Karschnia et al.

(10) Number: US 7,330,695 C1
(45) Certificate Issued: Feb. 17, 2015

(54) BUS POWERED WIRELESS TRANSMITTER

(75) Inventors: Robert J. Karschnia, Chaska, MN (US); Marcos Peluso, Chanhassen, MN (US); Mark G. Romo, Eden Prairie, MN (US)

(73) Assignee: Rosemount, Inc., Eden Prairie, MN (US)

Reexamination Request:
No. 90/012,930, Jul. 26, 2013

Reexamination Certificate for:
Patent No.: 7,330,695
Issued: Feb. 12, 2008
Appl. No.: 10/734,889
Filed: Dec. 12, 2003

(51) Int. Cl.
*H04B 7/00* (2006.01)
*H04W 84/18* (2009.01)

(52) U.S. Cl.
CPC .................................... *H04W 84/18* (2013.01)
USPC .......... 455/41.2; 455/134; 455/424; 455/572; 455/575.1; 455/90.3; 340/531; 396/58

(58) Field of Classification Search
None
See application file for complete search history.

(56) References Cited

To view the complete listing of prior art documents cited during the proceeding for Reexamination Control Number 90/012,930, please refer to the USPTO's public Patent Application Information Retrieval (PAIR) system under the Display References tab.

*Primary Examiner* — Dennis Bonshock

(57) ABSTRACT

A process control system utilizes wireless transceivers to divorce the field devices from traditional wired network topologies. By providing field devices with wireless transceivers and shared wireless transceivers for adapting wired field devices, the field device network may be adapted to any number of network topologies without concern for additional wiring costs. Specifically, a power supply can be provided for each field device or for groups of field devices, as needed. Thus, the entire network can receive power from a single power bus, without expensive power filtering. in addition, the network can be a hybrid, in which part of the information is transmitted and received over wired lines and part is transmitted received over wireless communications.

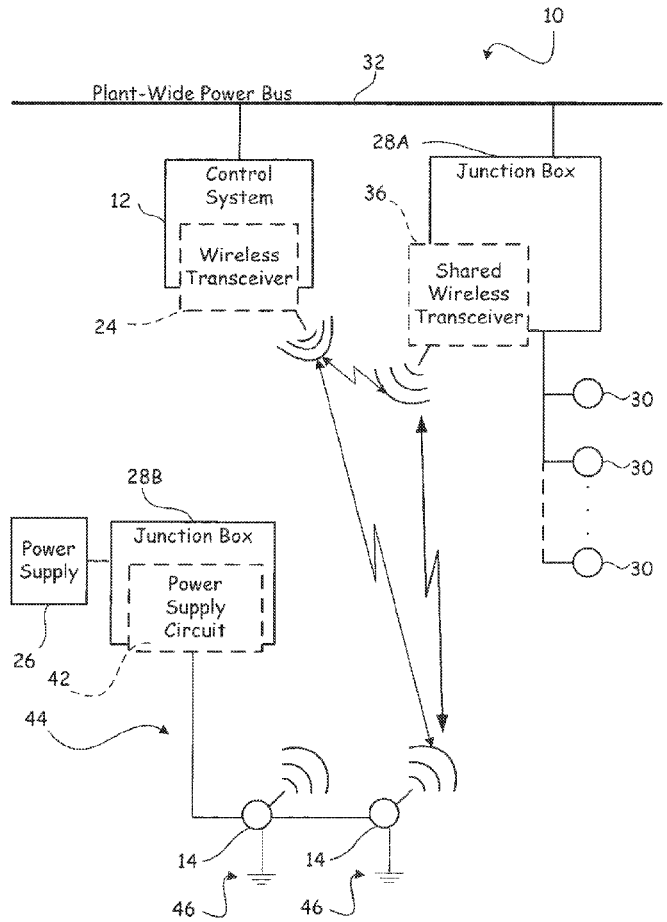

US 7,330,695 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 18 and 19 is confirmed.

Claims 3, 15, 21, 25, 27, 29, 30 and 33 are cancelled.

Claims 1, 8, 14, 16, 20, 23, 24, 26 and 31 are determined to be patentable as amended.

Claims 2, 4-7, 9-13, 17, 22, 28, 32 and 34-36, dependent on an amended claim, are determined to be patentable.

New claims 37-41 and 42 are added and determined to be patentable.

1. A distributed control and/or monitoring system within an industrial plant, the system comprising:
    a control/monitoring center;
    a plurality of field devices within the industrial plant having no hardwired communication link to the control/monitoring center and each other, each field device comprising:
      a transducer;
      a wireless transceiver for communicating wirelessly; and
    a plant-wide power bus for delivering power to each field device, wherein the power bus does not include and is separate from any communication signal path between the control/monitoring center and the field devices, *wherein the plant-wide power bus is a single wire bearing a voltage.*

8. A distributed system for monitoring an industrial process within an industrial plant, the system comprising:
    a control/monitoring center;
    a plurality of field devices for sensing or altering the industrial process, each field device having a transducer and a wireless transceiver for communicating signals between the field device and the control/monitoring center; and
    a *single-wire* plant-wide power bus comprising a *single* wire carrying an unfiltered voltage potential for delivering a voltage potential *of twenty-four or forty-eight volt alternating current (AC) or direct current (DC)* to each of the plurality of field devices, wherein the power bus does not include and is separate from any communication signal path between the control/monitoring center and the field devices.

14. A distributed control and/or monitoring system in an industrial plant, the system comprising:
    a control/monitoring center;
    a plurality of field devices, each field device having a transducer; a plurality of wireless transceivers, each wireless transceiver for sending and receiving wireless signals between the control/monitoring center and one or more of the plurality of field devices, each wireless transceiver being in electrical communication with at least one of the plurality of field devices; and
    power supplies for supplying power from a *single-wire* plant-wide power bus to the wireless transceivers and to the plurality of field devices, wherein the *single-wire plant-wide* power bus does not include and is separate from any communication signal path between the control/monitoring center and the field devices.

16. A method for retrofitting an existing field device network in an industrial plant for wireless communications, the method comprising:
    installing a first wireless transceiver in communication with a control/monitoring center;
    installing a second wireless transceiver on an existing *single-wire* plant-wide power bus and in communication with one or more field devices; and
    configuring the second wireless [transmitter] *transceiver* to communicate with the one or more field devices and to transmit data wirelessly from the one or more field devices to the control/monitoring center in addition to data transmitted over an existing communication link;
    wherein the *single-wire plant-wide* power bus does not include and is separate from any communication signal path between the control/monitoring center and the field devices.

20. A field device for use in an industrial plant having a *single-wire* plant-wide power bus, the field device comprising:
    a transducer;
    a wireless transceiver;
    a power terminal for connecting the field device to the *single-wire* plant-wide power bus;
    a ground connection for electrically grounding the field device; and
    an internal power supply circuit connected to the power terminal and the ground connection for supplying power to the transducer and the wireless transceiver;
    wherein the *single-wire plant-wide* power bus does not include and is separate from any communication signal path to or from the field devices, *and wherein the single-wire plant-wide power bus is a single wire carrying a voltage potential other than zero, and the power terminal is connectable to the single wire.*

23. A field device for use in an industrial plant having a *single-wire* plant-wide power bus, the field device comprising:
    a housing;
    a circuit disposed within the housing, the circuit comprising:
      a wireless transceiver for wireless communication with a control/monitoring center;
      a transducer; [and]
      an electrical terminal connectable to the plant-wide power bus for delivering power to the wireless transceiver and the transducer from the *single-wire* plant-wide power bus; *and*
      *a ground connection for grounding the circuit to earth ground;*
    wherein the power bus does not include and is separate from any communication signal path between the control/monitoring center and the field devices.

24. The field device of claim 23 wherein the *single-wire* plant-wide power bus is an AC or DC circuit.

26. A field device for use in an industrial plant having a *single-wire* plant-wide power bus, the field device comprising:
- a transducer and/or an actuator;
- a wireless transceiver; and
- a power supply circuit connectable to the *single-wire* plant-wide power bus *and to earth ground* for delivering power to the transducer and/or the actuator and to the wireless transceiver;
- wherein the *single-wire plant-wide* power bus does not include and is separate from any communication signal path to or from the field devices.

31. A distributed control and/or monitoring system comprising:
- a control/monitoring center;
- a plurality of field devices having no hardwired communication link to the control/monitoring center and each other wherein each of the plurality of field devices communicate wirelessly with the control/monitoring center through a self-organizing wireless network, each field device comprising:
  - a transducer;
  - a wireless transceiver for communicating wirelessly; and
- a common *single-wire* power bus for delivering power to each field device, wherein the *single-wire* power bus does not include and is separate from any communication signal path between the control/monitoring center and the field devices, *and wherein the single-wire power bus is a single wire bearing a voltage.*

37. The distributed system of claim 1, *wherein the single wire bears a DC voltage.*

38. The distributed system of claim 37, *wherein the DC voltage is 24 volts or 48 volts DC.*

39. The distributed system of claim 1, *wherein the single wire bears an AC voltage.*

40. The distributed system of claim 39, *wherein the AC voltage is 24 volts or 48 volts AC.*

41. *A field device for use in an industrial plant having a plant-wide DC power bus, the field device comprising:*
- *a transducer;*
- *a wireless transceiver;*
- *a power terminal for connecting the field device to the plant-wide DC power bus;*
- *a ground connection for electrically grounding the field device; and*
- *an internal power supply circuit connected to the power terminal and the ground connection for supplying power to the transducer and the wireless transceiver;*
- *wherein the DC power bus does not include and is separate from any communication signal path to or from the field devices; and*
- *wherein the plant-wide DC power bus is a single wire carrying a voltage potential other than zero, and the power terminal is connectable to the single wire.*

42. *The field device of claim 41 wherein the field device is connectable directly to ground via the ground connection.*

\* \* \* \* \*